United States Patent [19]

Anderson

[11] Patent Number: 5,453,686
[45] Date of Patent: Sep. 26, 1995

[54] PULSED-DC POSITION AND ORIENTATION MEASUREMENT SYSTEM

[75] Inventor: Peter T. Anderson, Burlington, Vt.

[73] Assignee: Polhemus Incorporated, Colchester, Vt.

[21] Appl. No.: 45,469

[22] Filed: Apr. 8, 1993

[51] Int. Cl.$^6$ ................................................ G01B 7/14
[52] U.S. Cl. ............................. 324/207.17; 324/207.26
[58] Field of Search .................... 324/207.12, 207.16, 324/207.17, 207.26, 244, 245, 247, 225, 260; 33/361; 364/559

[56] References Cited

U.S. PATENT DOCUMENTS

| | | |
|---|---|---|
| 3,432,751 | 3/1969 | Godby et al. . |
| 3,868,565 | 2/1975 | Kuipers . |
| 3,983,474 | 9/1976 | Kuipers . |
| 3,991,361 | 11/1976 | Mattern et al. . |
| 4,054,881 | 10/1977 | Raab . |
| 4,116,057 | 9/1978 | Sullivan . |
| 4,197,855 | 4/1980 | Lewin . |
| 4,208,024 | 6/1980 | Killpatrick et al. . |
| 4,287,809 | 9/1981 | Egli et al. . |
| 4,298,874 | 11/1981 | Kuipers . |
| 4,303,077 | 12/1981 | Lewin et al. . |
| 4,314,251 | 2/1982 | Raab . |
| 4,316,253 | 2/1982 | Posseme . |
| 4,327,498 | 5/1982 | Setter et al. . |
| 4,328,548 | 5/1982 | Crow et al. . |
| 4,346,384 | 8/1982 | Raab . |
| 4,394,831 | 7/1983 | Egli et al. . |
| 4,396,885 | 8/1983 | Constant ............................ 324/207.17 |
| 4,470,013 | 9/1984 | Posseme . |
| 4,560,930 | 12/1985 | Kouno . |
| 4,613,866 | 9/1986 | Blood . |
| 4,622,644 | 11/1986 | Hansem . |
| 4,688,037 | 8/1987 | Krieg . |
| 4,710,708 | 12/1987 | Rorden et al. . |
| 4,737,794 | 4/1988 | Jones . |
| 4,742,356 | 5/1988 | Kuipers . |
| 4,845,503 | 7/1989 | Adam et al. . |
| 4,849,692 | 7/1989 | Blood . |
| 4,945,305 | 7/1990 | Blood . |
| 5,109,194 | 4/1992 | Cantaloube ....................... 324/207.17 |
| 5,168,222 | 12/1992 | Volsin et al. ..................... 324/207.17 |
| 5,187,540 | 2/1993 | Morrison . |

OTHER PUBLICATIONS

European Search Report for Application No. EP 94 30 2507.

Primary Examiner—Sandra L. O'Shea
Assistant Examiner—Warren S. Edmonds
Attorney, Agent, or Firm—Price, Heneveld, Cooper, DeWitt & Litton

[57] ABSTRACT

A remote object position and orientation determining system employs electromagnetic coupling to sense the position and orientation of a remote object. A plurality of electromagnetic fields are generated having steady state components by applying time-division multiplexed pulsed DC signals to a plurality of field generating elements having spatially independent components defining a source reference coordinate frame. In this manner, the fields are distinguishable from one another. The generated electromagnetic fields are sensed with a remote sensor having a plurality of passive field-sensing elements having spatially independent elements in order to detect the rate-of-change of each of the generated electromagnetic fields. The output of the remote sensors are integrated in order to establish the steady state components of the generated electromagnetic fields. The steady state components are resolved into remote object position and orientation relative to the source reference coordinate frame.

43 Claims, 3 Drawing Sheets

PULSED-DC POSITION AND ORIENTATION MEASUREMENT SYSTEM

BACKGROUND OF THE INVENTION

This invention relates generally to remote object position and orientation determining systems employing electromagnetic coupling and, more particularly, to a unique sensing and processing technique for such systems.

Remote object position and orientation determining systems employing AC electromagnetic coupling are disclosed in U.S. Pat. No. 3,868,565 issued to Jack Kuipers for an OBJECT TRACKING AND ORIENTATION DETERMINING MEANS, SYSTEM AND PROCESS and U.S. Pat. No. 4,054,881 issued to Frederick Raab for a REMOTE OBJECT POSITION LOCATOR. Such systems traditionally have a source assembly that includes a plurality, typically three, of concentrically positioned, orthogonal field generating antennas for generating a plurality of electromagnetic fields. Signals are applied to the field generating antennas that are multiplexed so that the resulting electromagnetic fields are distinguishable from one another. Located at the remote object is a sensor having a plurality, also typically three, of concentrically positioned, orthogonal receiving antennas for receiving the electromagnetic fields generated by the transmitting antenna and producing signals corresponding to the received electromagnetic fields. A processor resolves the signals produced by the receiving antenna into remote object position and orientation in the reference coordinate frame of the source.

In U.S. Pat. No. 4,945,305 issued to Ernest B. Blood for a DEVICE FOR QUANTITATIVELY MEASURING THE RELATIVE POSITION AND ORIENTATION OF TWO BODIES IN THE PRESENCE OF METALS UTILIZING DIRECT CURRENT MAGNETIC FIELDS, a remote object position and orientation determining system is disclosed in which the transmitting antennas are driven sequentially by a pulsed, direct current signal. The generated electromagnetic fields are sensed by a DC-field-sensitive sensor in each of the three orthogonal components of the sensor reference coordinate frame and are resolved into remote object position and orientation relative to the source reference coordinate frame. The purpose of the system disclosed in Blood is to reduce field distortions resulting from the decay of eddy currents induced in electrically conductive materials by magnetic fields. Blood teaches that these disadvantages are overcome by applying a pulsed-DC signal to a source axis, which will induce an eddy current in any surrounding conducting metal only at the beginning of the pulse. The Blood system waits enough time for the eddy current to decay before measuring the transmitted flux. Alternatively, the received signal is measured several times as the eddy current is dying out and curve-fitted to an exponential decay math function in order to remove the effect of the eddy current field distortion.

The Blood system is not without its drawbacks. In order to measure a DC field, a complex, bulky and expensive active sensor must be employed. An example of a sensor that is sufficiently sensitive for most applications is a flux-gate active sensor. However, the complexity, and, hence, the bulk of such active sensors do not adapt well to many applications, such as to a digitizer of the type disclosed in U.S. Pat. No. 4,945,305. The sensor is positioned on a stylus that is held in the user's hand. An active flux-gate sensor is not only more bulky but requires an increase in the number of signals exchanged, and hence wires, between the sensor and the electronics unit. Another significant limitation of the system disclosed in Blood is the poor signal-to-noise performance characteristics of active DC sensors. The poor signal-to-noise ratio of active DC sensors as compared with passive AC sensors limits the range at which the system disclosed in Blood may operate with satisfactory accuracy.

Because the sensor employed in Blood is a DC field sensor, the sensor measures a composite static magnetic field made up of the pulsed-DC field from the source and a constant DC field surrounding the earth, i.e., the earth's magnetic field. Prior to resolving the sensor measurements into position and orientation, the Blood system must subtract out the effect of the earth's magnetic field. Because, at nominal source/sensor spacing, the earth's field is an order of magnitude greater than the DC field generated by the source, it must resort to hardware to subtract out the earth's field. This is necessary in order to avoid limitations in the dynamic range of the analog-to-digital converter. Furthermore, a quiescent period during which no source coil is being excited is necessary in order to allow the magnitude of the earth's magnetic field to be measured. All of this adds further complexity and error to the Blood system.

SUMMARY OF THE INVENTION

The present invention is embodied in a method and apparatus for determining the position and orientation of a remote object relative to a reference coordinate frame in which a source having a plurality of field generating elements is provided to generate electromagnetic fields. The field generators have spatially independent components in order to define a source reference coordinate frame. According to one aspect of the invention, pulsed-DC signals are applied sequentially to the plurality of field generators by a driver. The pulsed-DC signals are time-division multiplexed in order to generate a plurality of electromagnetic fields that have steady state components and are distinguishable from one another. The rates-of-change of the generated electromagnetic fields are received by a remote sensor having a plurality of passive field sensor elements. The field sensor elements have spatially independent components in order to detect each of the generated fields. A processor is provided to resolve the output of the field sensor into remote object position and orientation relative to the source reference coordinate frame.

According to another aspect of the invention, the processor includes at least one signal integrator that is adapted to integrate the output of the remote sensor over a given period of time. The result is that the signal integrator establishes the steady state components of the generated electromagnetic field. The processor includes a calculator to calculate remote object position and orientation from the established steady state field components.

Because the present invention employs a passive remote sensor that is responsive to the rate-of-change of the generated electromagnetic fields, static fields, such as that generated by the earth's magnetic field, are not sensed. Because the sensor does not detect the static earth magnetic field, there is no need to subtract the earth's magnetic field from the readings. Furthermore, a passive sensor is less complex and bulky than an active DC sensor. This adapts position and orientation measurement systems more readily to applications requiring a miniature sensor, such as hand-held styluses of digitizers, helmet-mounted head trackers, data gloves, and the like. Furthermore, the passive rate-of-change responsive sensor has a significantly higher signalto-noise ratio than an active sensor particularly at the relatively fast update rates required for all but a relatively limited number of applications.

The present invention achieves all of the advantages of the Blood device. It is capable of reducing the field distorting effect of eddy currents resulting from electrically conductive materials in the vicinity of the system and, thereby, the degree of other compensating techniques employed in all position and orientation measuring systems. These and other objects, advantages and features of this invention will become apparent upon review of the following specification in conjunction with the drawings.

DESCRIPTION OF THE PREFERRED EMBODIMENT

A. Apparatus

Figure 1:
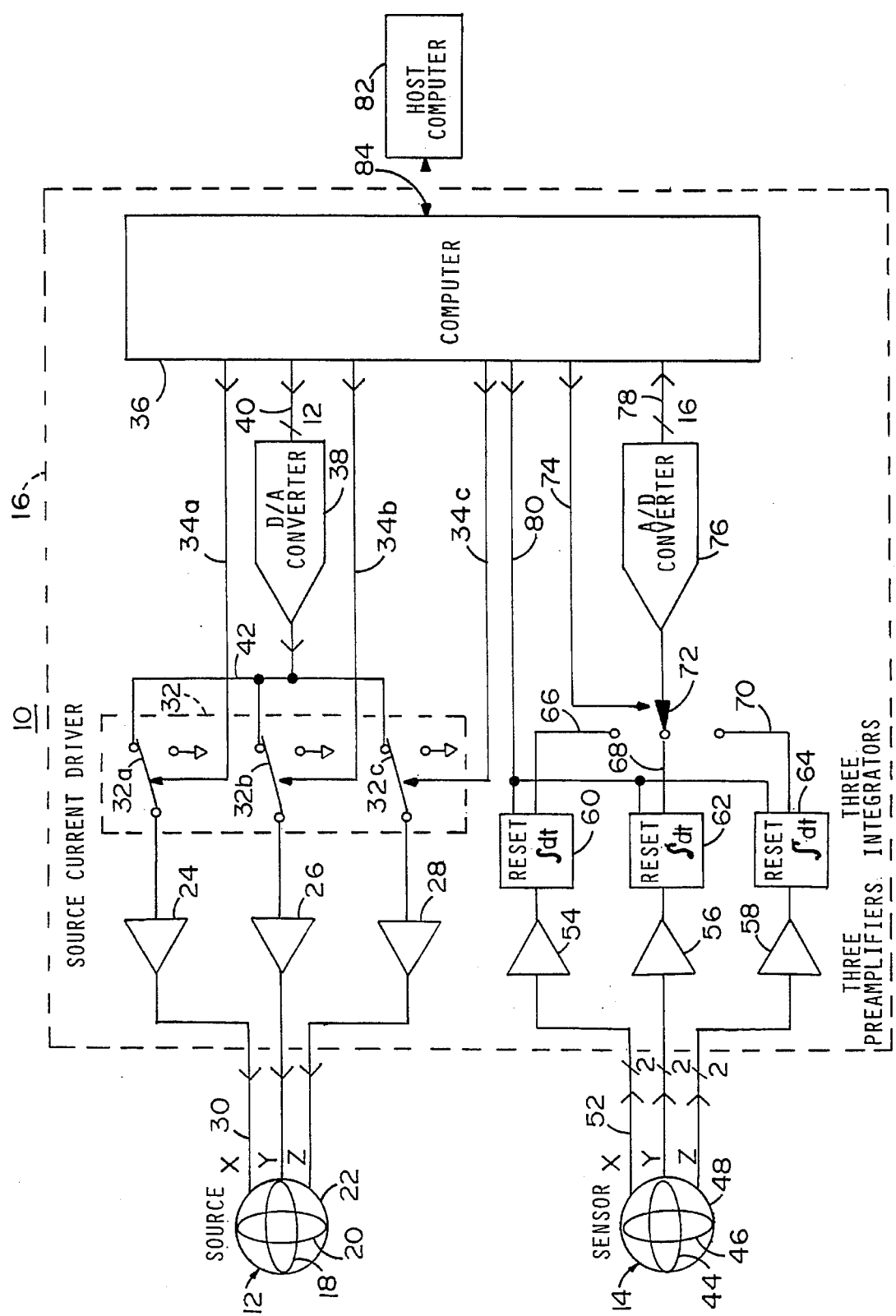
FIG. 1 is a block diagram of a position and orientation measurement system according to the invention.

Referring now to the drawings, and the illustrative embodiments depicted therein, a functional diagram of an apparatus 10 for determining position and orientation of a remote object relative to a coordinate reference frame includes a source of electromagnetic field, generally illustrated at 12, a remote sensor generally illustrated at 14 and an electronic unit 16 (FIG. 1). The mode of operation, including appropriate algorithms for determining the position and orientation of sensor 14 in the reference coordinate frame of source 12, is disclosed in detail in U.S. Pat. No. 4,737,794 issued to Herbert R. Jones for a METHOD AND APPARATUS FOR DETERMINING REMOTE OBJECT ORIENTATION AND POSITION, the disclosure of which is hereby incorporated herein by reference, and will not be repeated.

Source 12 includes a plurality of source elements such as generating antennas 18, 20 and 22. Generally, three mutually orthogonal antennas are preferred; however, it is only necessary that no two antennas be parallel. Field generators 18, 20 and 22 are typically three magnetic loop windings wound successively around a bobbin (not shown) to produce three orthogonal coils centered about a common point, the center of the bobbin. The three antennas 18, 20 and 22 are supplied with time-division multiplexed pulsed-DC signals from current drivers 24, 26 and 28 over source cable 30. The signals are multiplexed so that the fields generated by each of the antennas are distinguishable from one another. The time-division multiplexing is accomplished by a demultiplexer 32 which is illustrated as a set of switches 32a, 32b and 32c that are actuated in sequence by output lines 34a, 34b and 34c of a processor, such as microcomputer 36. A digital-to-analog converter 38, which is a 12-bit device in the illustrated embodiment, is driven from processor 36 over a bus 40 to produce an analog signal at 42 that is supplied as input to current drivers 24, 26 and 28 in response to demultiplexer 32. It should be understood that, in the illustrated embodiment, three current drivers, or power amplifying circuits, are provided, each being connected to one of the three field generating antennas with the demultiplexer sequentially applying an actuation signal to each of the antennas through the three individual driving circuits. However, it will be appreciated, by those skilled in the art, that any one of a number of suitable multiplexing schemes may be employed.

Figure 5:
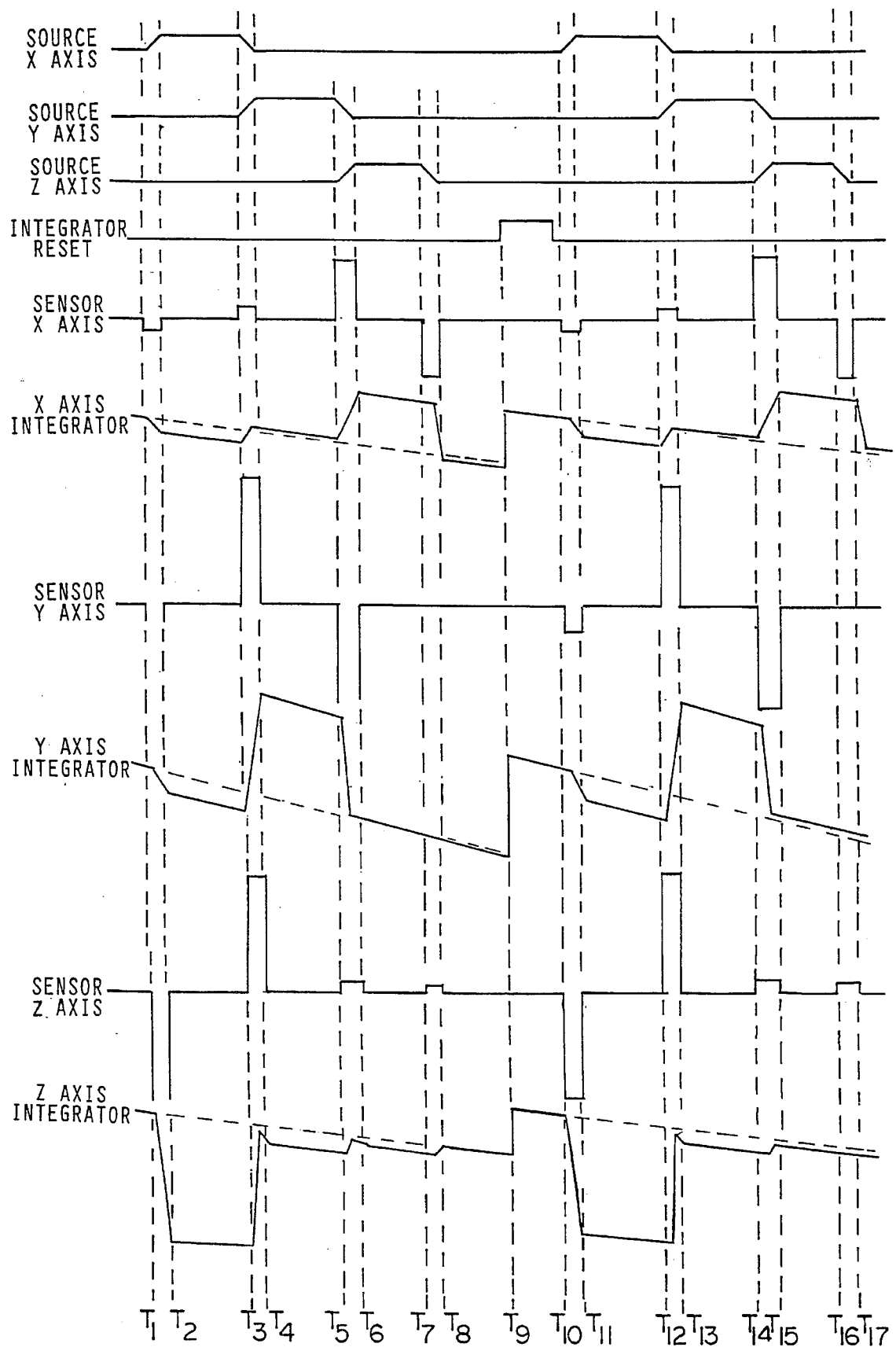
FIG. 5 is a signal diagram illustrating the sequence of operation of a position and orientation measurement system and method according to the invention.

The basic system transmission cycle is illustrated in FIG. 5 in which processor 36 closes switch 32a in order to produce a DC pulse with current driver 24 on the source X axis from time interval $T_1$ through $T_4$ with the pulse having a suitable rise time from period $T_1$ to $T_2$ and a fall time from period $T_3$ to period $T_4$. Likewise, processor 36 closes switch 32b in order to produce a DC pulse on the source Y axis during time interval $T_3/T_4$ to $T_5/T_6$. A DC pulse is produced on the source Z axis during interval $T_5/T_6$ to $T_7/T_8$ by the closing of switch 32c. The amplitude of the pulse produced on the three antennas is a function of the output of D/A converter 38 and is regulated in order to provide automatic gain control to compensate for large variations in source-to-sensor spacing, as will be appreciated by those skilled in the art.

Figure 3:
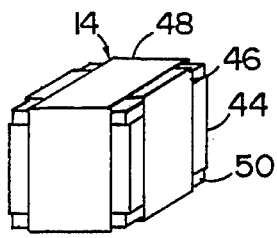
FIG. 3 is a perspective view of a passive sensor useful with the invention.

Sensor 14 includes a plurality of elements, such as antennas 44, 46 and 48. The antennas are preferably loop antennas that are wound successively around a bobbin 50 to produce three orthogonal coils centered about a common point, the center of bobbin 50 (FIG. 3). Antennas 44, 46 and 48 are passive devices which respond to the rate-of-change of magnetic field dB/dt. The outputs of the antennas 46, 48 and 50 are supplied via cable 52 to differential preamplifiers 54, 56 and 58, respectively. The outputs of amplifiers 54, 56 and 58 are supplied, respectively, to integrators 60, 62 and 64. Integrators 60, 62 and 64 provide respectively outputs 66, 68 and 70, which are supplied as inputs to a multiplexer indicated generally at 72. The output of antennas 44, 46 and 48 constituting sensor 14 respond to the rate-of-change of magnetic field dB/dt. The amplified sensor voltages are integrated by integrators 60, 62 and 64 to produce outputs at 66, 68 and 70 that are proportional to the sensed magnetic field B, plus a constant of integration.

Multiplexer 72 is illustrated schematically as being controlled by processor 36 over an output port 74 in order to sequentially interconnect outputs 66, 68 and 70 with the input of an A/D converter 76. A/D converter 76, which is a 16-bit device in the illustrated embodiment, provides an input to processor 36 over a bus 78. A reset line 80 is driven by processor 36 in order to periodically reset integrators 60, 62 and 64, as will be described in more detail below. In practice, demultiplexer 32 and multiplexer 72 would be embodied in solid-state logic devices. D/A converter 38 and A/D converter 76 may be built into processor 36. Processor 36 may be embodied in a suitably programmed, commercially available microprocessor.

Processor 36 provides the necessary timing signals for driving demultiplexer 32, adjusting the gain of the amplifiers via D/A converter 38, driving multiplexer 72 in order to sample the outputs of integrators 60, 62 and 64, and resetting integrators 60, 62 and 64. Processor 36 also calculates the position and orientation of sensor 44 in a reference coordinate frame defined by the three orthogonal coils of source 12 and supplies the result to a host computer 82 over a data bus 84. In the illustrated embodiment, the transmission sequence of pulsing each of the three source axes in sequence is repeated between 60 and 120 repetitions per second. However, the skilled artisan would understand that such parameter is specific to the application and may be a variable repetition rate in order to adapt to conditions during which it is determined that large amounts of conducting metal are present resulting in large eddy current effects. The repetition rate would adapt during such presence in order to provide sufficient time for eddy currents to settle out prior to measuring the integrator outputs.

Figure 2:
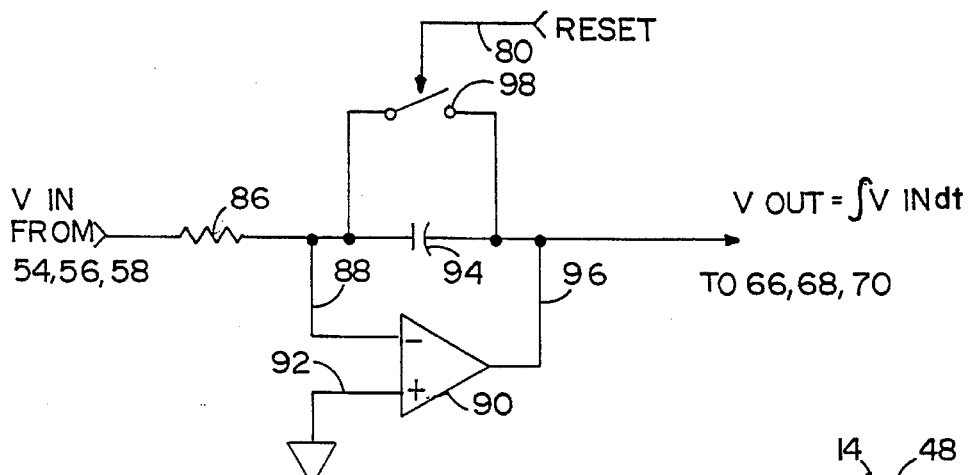
FIG. 2 is an electrical schematic diagram of an integrator useful with the invention.

The details of integrators 60, 62 and 64 are illustrated in FIG. 2 in which the output of the respective amplifier 54, 56 or 58 is supplied as input $V_{IN}$ via a gain establishing resistor 86 to an inverting input 88 of a differential amplifier 90. A non-inverting input 92 of amplifier 90 is connected with signal ground and a capacitor 94 connected in a feedback loop between an output 96 and input 88. Reset line 80 is illustrated as actuating a switch 98 in order to short capacitor 94 and, thereby, reset the integrator to an original state. Additionally, while switch 98 is closed, the integrator will not integrate. Integrator 60, 62, 64 produces an output at 96 that is the integral of the input received from the respective amplifier 54, 56, 58 during a period of time beginning with the opening of switch 98. Of course, it is to be understood that the configuration of integrator 60, 62, 64 in FIG. 2 is for illustration purposes only and that the integration function may be performed digitally or reside in software in processor 36.

Remote object position and orientation determining system 10 has a wide variety of applications. For example, sensor 14 can be associated with the stylus of a three-dimensional digitizer which is used to trace a physical model or the like and generate a digital database. The resulting database can then be used to generate a wide variety of computer generated images of the physical model. For example, the database, created by tracing the physical model, may be used to develop engineering and layout drawings. In plant design, for example, the database may be used to compile parts' lists and may interface with additional software to accomplish various engineering tasks. Applications for such three-dimensional digitizers are found in such diverse industries as architectural engineering, shoe design and plastic bottle manufacturing. In another application, the digital database is created by tracing the physical models which can be used to generate complex computer generated imagery in the film making art. In still another application, the sensor can be associated with a particular body part for the purpose of conducting biomedical studies or for manipulating three-dimensional images displayed on a design computer. In an important military application, the sensor is associated with the helmet sighting reticle of the pilot of a military aircraft for determining the line of sight of the pilot to the target and thereafter initializing ordnance which is directed along the line of sight to the target. In the field of head motion sensing generally, the system can be employed as an input to a virtual reality system in order to drive the displayed image to coincide with the user's head position. Still another application involves the monitoring of the body movements of an invalid for the purpose of creating a non-verbal communication system or providing a technique for remotely controlling various devices with non-verbal communicative body motion. It should be appreciated that in many of these applications, the accuracy and speed of the processing technique for converting the signal set received by the remote object into remote object position orientation is critical to the success of the application. This is particularly true, for example, in cases where the pilot of a military aircraft traveling at several hundred miles an hour is attempting to initialize ordnance to be delivered to a target within the reticle of his helmet-mounted sight.

B. Signal Processing

Eddy currents may be induced in conducting non-ferrous metals in the vicinity of position and orientation determining systems. The transient electromagnetic field produced by the source induces a transient voltage in the metal, which induces a current loop which is known as an eddy current. Once the field generated by the source becomes steady, the current flowing through the conductive metal dissipates and decays. The decay of the eddy current generates a field, which distorts the field generated by the source.

Figure 4:
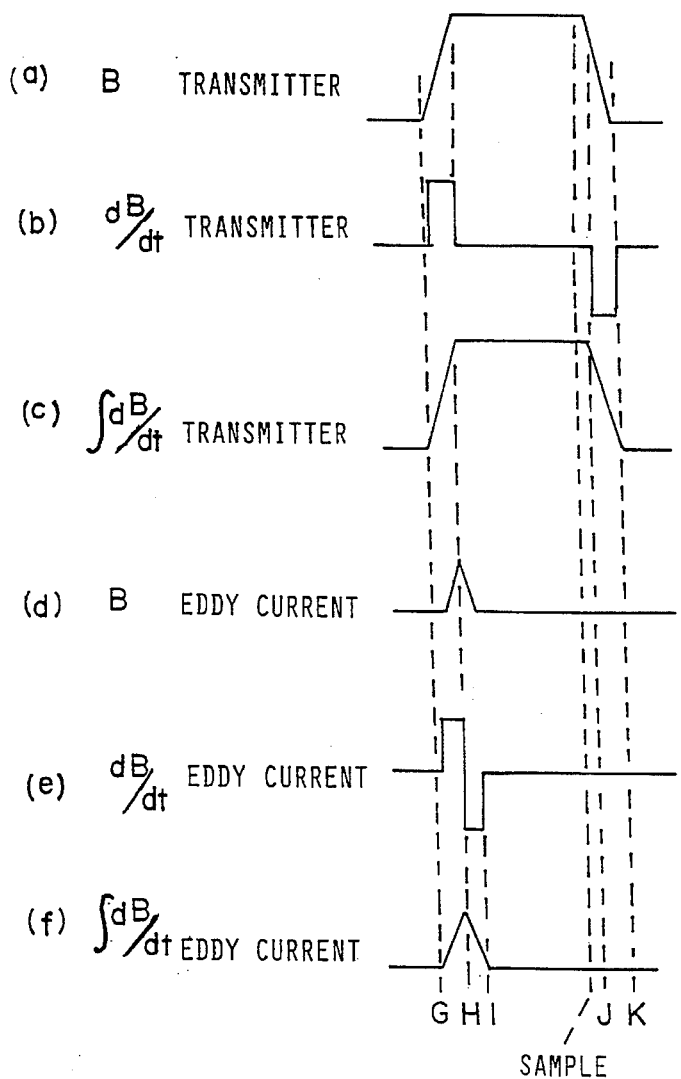
FIG. 4 is a signal diagram illustrating the principle of the invention.

In order to understand the manner in which the present invention accomplishes the measurement of the magnetic field B generated by the source while eliminating the effects of eddy currents, reference is made to FIG. 4 in which a pulsed-DC electromagnetic field B is illustrated in FIG. 4a. It is seen that the pulse begins to rise at point G, is generally flat from approximately point H to point J and decays to point K. The signal received by a passive sensor element, such as a dipole antenna in field B, is illustrated in FIG. 4b. It is seen that the passive sensor element responds to the change in field B, or dB/dt. It may be seen by reference to FIG. 4c that integrating the output of the sensor element results in retrieving the value of B, at least during the interval generally between points H and J. Accordingly, by sampling the output of the integrator at a point between points H and J, the value of the field sensed by the passive sensor element is reconstructed even though the sensor is not producing an output. As the generated field B returns to zero between points J and K, a signal of opposite polarity is received by the sensor element causing the integrator output to, likewise, return to zero.

A typical eddy current induced by the transmitted field of FIG. 4a is illustrated in FIG. 4d. It is seen that the result of the eddy current is a field distorting phenomena of opposite sense from the transmitted electromagnetic field. The value of the dB/dt contributed by the eddy current and sensed by the passive sensor element is illustrated in FIG. 4e. When integrated, the result of the eddy current on the sensed field is illustrated in FIG. 4f as a triangular waveform from period G to I. However, once the effects of the eddy current are diminished at point I, the effect of the eddy current on the integrated output of the sensor is cancelled. Thus, when the integrator is sampled at point J, the detrimental field distorting effects of the eddy currents have been eliminated and a true representation of the electromagnetic field generated by the source and sensed by the sensor has been obtained.

Application of the principles of the invention to position orientation measuring system 10 is illustrated in FIG. 5 in which time-division multiplexed pulsed-DC fields generated by source antennas 18, 20 and 22 are illustrated as pulses produced by each of the source X, Y and Z axes. The effects of the fields generated by the source on the antennas 44, 46 and 48 of the sensor are illustrated on the sensor X axis, sensor Y axis and sensor Z axis. It should be noted that there is no particular spatial relationship between the X axis of the source and the X axis of the sensor. Indeed, the sensor is free to translate and rotate in six degrees of freedom with respect to the source. It is seen that the pulse generated between periods $T_1/T_2$ and $T_3/T_4$ by the source X axis induces signals in each of the sensor X, Y and Z axes antenna. The output of integrators 60, 62 and 64 associated with their respective sensor elements is illustrated as the X axis integrator, Y axis integrator and Z axis integrator signals. It is seen that each magnetic pulse generated by one of the source axes results in a pulse output from each of the integrators resulting from the rise and fall of the transmitted electromagnetic field which are transient signals sensed by the respective passive sensor elements 44, 46 and 48. The negative slope of the baseline of each of the integrator outputs 66, 68 and 70 is a result of a negative DC offset voltage on the output of preamplifiers 54, 56 and 58. Unless the integrators were periodically reset, this slope would cause the integrator amplifiers 90 to saturate. Upon reset, the integrator baselines return to zero as seen at point $T_9$.

In order to resolve the sensed signals into position and orientation of the sensor in the reference coordinate of the source, the outputs of each of the integrators are sampled at time $T_3$ in order to determine the effect of the source X axis pulse, at time $T_5$ in order to determine the effect of the source Y axis pulse and time $T_7$ in order to determine the effect of the source Z axis pulse. The integrators are additionally sampled at time $T_9$ when the source is not generating a field and prior to resetting of the integrators. The integrators are reset from time period $T_9$ to $T_{10}$ and are again sampled at $T_{10}$. The readings of the integrators prior to and during reset are used to remove the errors resulting from offsets in the integrators and in the preamplifiers and as a result of any steady movement of the sensor in the earth's magnetic field. Such movement is sensed as a transient field and produces an error in the field measurements. The errors are calculated and subtracted by using linear interpolation. In a preferred embodiment, all of the sampling intervals are evenly spaced in order to provide sample intervals of equal duration to simplify calculations. As a result, during one field generation sequence, 15 measurements are taken corresponding to the effect of each of the three field pulses on each of the three sensor axes as well as a reading prior to and during the reset of each of the integrators.

The above-described signal analysis relies upon a settling of the fields prior to sampling the output of each integrator 60, 62 and 64. This is accomplished by sampling each integrator at the end of each field pulse which, under most conditions, will be at a moment in time after eddy currents have died out. Under such scheme, the optimum time to sample would be immediately before the fall of the field pulse. This point could be readily determined because processor 36 controls the timing of both the source and sensor and the characteristics of the source coils are known to the system designer. Other sampling techniques are possible. Rather than sampling each integrator at the end of each source pulse, multiple integrator sampling can be taken spread across the duration of the pulse. Applying known curve-fitting statistical analysis, the multiple sample points can be used to mathematically eliminate the effects of eddy current on the generated field.

C. Mathematical Processing

Position and orientation measurement systems calculate the position and orientation of the remote sensor in the reference coordinate frame of the source by measuring the field received by each sensor antenna as generated by each of the source antennas. A 3×3 corrected signal matrix S is developed after compensation of the received fields for various known error sources, such as field distortion, lack of orthogonality of the source, and sensor coils and non-concentricity of the coils, as disclosed in U.S. patent application Ser. No. 07/911,204, filed Jul. 9, 1992, invented by Herbert R. Jones for a NON-CONCENTRICITY COMPENSATION IN POSITION AND ORIENTATION MEASUREMENT SYSTEMS. The signal matrix S may then be converted to remote object position and orientation utilizing known algorithms.

In the present position orientation measurement system 10 the signal matrix S is developed as follows:

$$S = \begin{vmatrix} XscrXsen & YscrXsen & ZsrcXsen \\ XscrYsen & YsrcYsen & ZsrcYsen \\ XscrZsen & YscrZsen & ZsrcZsen \end{vmatrix}$$

where each of the nine elements is derived as follows:

XsrcXsen=AD(XSRC,Xinteg)-0.75AD(RESET,Xinteg)-0.25AD(NOSRC,Xinteg)

XsrcYsen=AD(XSRC,Yinteg)-0.75AD(RESET,Yinteg)-0.25AD(NOSRC,Yinteg)

XsrcZsen=AD(XSRC,Zinteg)-0.75AD(RESET,Zinteg)-0.25AD(NOSRC,Zinteg)

YsrcXsen=AD(YSRC,Xinteg)-0.50AD(RESET,Xinteg)-0.50AD(NOSRC,Xinteg)

YsrcYsen=AD(YSRC,Yinteg)-0.50AD(RESET,Yinteg)-0.50AD(NOSRC,Yinteg)

YsrcZsen=AD(YSRC,Zinteg)-0.50AD(RESET,Zinteg)-0.50AD(NOSRC,Zinteg)

ZsrcXsen=AD(ZSRC,Xinteg)-0.25AD(RESET,Xinteg)-0.75AD(NOSRC,Xinteg)

ZsrcYsen=AD(ZSRC,Yinteg)-0.25AD(RESET,Yinteg)-0.75AD(NOSRC,Yinteg)

ZsrcZsen=AD(ZSRC,Zinteg)-0.25AD(RESET,Zinteg)-0.75AD(NOSRC,Zinteg)

where, for X, Y and Z sources and X, Y and Z sensor integrators,

AD(iSRC, jinteg) is the sampled integrator value for the jth sensor integrator; while the ith source is transmitting, AD(RESET, jinteg) is the sampled integrator value for the jth sensor integrator during integrator reset interval $T_9$ to $T_{10}$, and AD(NOSRC, jinteg) is the sampled integrator value for the jth sensor integrator during interval $T_8$ to $T_9$ when no transmission source is transmitting.

The purpose of subtracting the two terms from each of the nine integrator outputs, representing the three source axes and the three sensor axes, is to eliminate the effect of the slope of the integrator output, which may be observed in FIG. 5 as the incline of the integrator signal trend. As previously noted, this slope is a result of DC offsets in the preamplifiers being integrated by the integrators. This slope may be removed from the calculations by determining the integrator outputs before and after reset in order to establish the endpoints of the integrator baseline at the beginning and end of each generation cycle. This linear interpolation could be eliminated if both the preamplifiers and integrators had no appreciable drift. By providing such compensation, low cost components may be utilized to implement the system rather than high cost zero drift components. The present processing technique additionally has the feature of cancelling errors introduced by movement of the sensor antenna. Such movement in the earth's magnetic field will induce a signal in one or more of the sensor antennas. For constant velocity movements, the present technique is exceptionally accurate in eliminating any resulting effects. For accelerating or decelerating movements, the compensation is less accurate but sufficient under most conditions.

D. Conclusion

Thus, it is seen that a position and orientation measuring system is provided which is a significant advancement over prior position and orientation measuring systems, particularly prior pulsed-DC systems. The beneficial effect of reduced sensitivity to eddy current induced field distortion resulting from the presence of conducting metal is accomplished utilizing simpler, less bulky and less expensive hardware than that previously proposed. Because the present invention senses the rate of change of magnetic flux rather than the actual value of magnetic flux, the earth's magnetic field is not sensed. Accordingly, the necessity of subtracting the earth's magnetic field from the sensor readings is eliminated. At the measurement update rate required for most practical applications, a significant increase in signal-to-noise ratio is achieved.

Changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. An apparatus for determining the position and orientation of a remote object relative to a reference coordinate frame comprising:

a source having a plurality of field generating elements, wherein said field generating elements generate electromagnetic fields and have spatially independent components defining a source reference coordinate frame;

a driver, wherein said driver applies to said plurality of field generating elements, signals which generate a plurality of electromagnetic fields, wherein said driver generates pulsed-DC Signals that are applied sequentially to said field generating elements, defining a field generation cycle, whereby said electromagnetic fields have steady state components and are time-division multiplexed, said electromagnetic fields being distinguishable from one another;

a remote sensor having a plurality of field sensing elements, wherein said field sensing elements sense each of said generated electromagnetic fields and have spatially independent components; and a processor, wherein said processor processes the output of said sensor into remote object position and orientation relative to said source reference coordinate frame, said processor including a signal integrator that is adapted to integrating the output of at least one of said sensing elements over a given period of time in order to establish the steady state components of said generated electromagnetic field and a calculator that is adapted to calculate remote object position and orientation from the steady state components.

2. The apparatus in claim 1 wherein said given period of time is one said field generation cycle.

3. The apparatus in claim 2 wherein said processor samples said integral approximately at the end of each of said pulsed-DC signals.

4. The apparatus in claim 2 wherein said processor samples said integral a plurality of times during each of said pulsed-DC signals.

5. The apparatus in claim 1 wherein processor samples said integral approximately at the end of each of said pulsed-DC signals.

6. The apparatus in claim 5 wherein said processor samples said integral a plurality of times during each of said pulsed-DC signals.

7. The apparatus in claim 1 wherein each of said field sensing elements is a passive sensor that responds to the rate-of-change of said electromagnetic fields.

8. The apparatus in claim 1 wherein said given period of time is one said field generation cycle.

9. The apparatus in claim 1 wherein said processor resets said integrator after said given period of time and samples said integral before and after resetting said integrator.

10. The apparatus in claim 1 wherein said signal integrator is adapted to integrate the outputs of all of said sensing elements over said given period of time.

11. The apparatus in claim 1 wherein said processor includes a programmed computer and wherein said programmed computer defines said integrator.

12. An apparatus for determining the position and orientation of a remote object relative to a reference coordinate frame comprising:

a source having a plurality of field generating elements, wherein said field generating elements generate electromagnetic fields and have spatially independent components defining a source reference coordinate frame;

a driver, wherein said driver applies sequentially to said plurality of field generating elements pulsed-DC signals which are time-division multiplexer, defining a field generation sequence, in order to generate a plurality of electromagnetic fields that have steady state components and are distinguishable from one another;

a remote sensor having a plurality of passive field sensing elements that are responsive to the rate-of-change of said generated electromagnetic fields in order to sense each of said generated electromagnetic fields, said sensing elements having spatially independent components; and a processor, wherein said processor processes the output of said sensor into remote object position and orientation relative to said source reference coordinate frame.

13. The apparatus in claim 12 wherein said processor includes a signal integrator, wherein said integrator integrates the output of all of said field sensing elements over a given period of time in order to produce an integral for each said output, and a calculator, wherein said calculator calculates remote object position and orientation relative to said source reference coordinate frame from said integrals.

14. The apparatus in claim 13 wherein said given period of time is one said field generation cycle.

15. The apparatus in claim 13 wherein calculator samples each said integral approximately at the end of each of said pulsed-DC signals.

16. The apparatus in claim 13 wherein said calculator samples each said integral a plurality of times during each of said pulsed-DC signals.

17. The apparatus in claim 13 wherein said processor resets said integrator after said given period of time and samples said integral before and after resetting said integrator.

18. The apparatus in claim 17 wherein said calculator calculates remote position and orientation from a matrix S where $$S = \begin{vmatrix} XscrXsen & YscrXsen & ZsrcXsen \\ XscrYsen & YsrcYsen & ZsrcYsen \\ XscrZsen & YscrZsen & ZsrcZsen \end{vmatrix}$$

where

XsrcXsen=AD(XSRC,Xinteg)-0.75AD(RESET,Xinteg)-
    0.25AD(NOSRC,Xinteg)
XsrcYsen=AD(XSRC,Yinteg)-0.75AD(RESET,Yinteg)-
    0.25AD(NOSRC,Yinteg)
XsrcZsen=AD(XSRC,Zinteg)-0.75AD(RESET,Zinteg)-
    0.25AD(NOSRC,Zinteg)
YsrcXsen=AD(YSRC,Xinteg)-0.50AD(RESET,Xinteg)-
    0.50AD(NOSRC,Xinteg)
YsrcYsen=AD(YSRC,Yinteg)-0.50AD(RESET,Yinteg)-
    0.50AD(NOSRC,Yinteg)
YsrcZsen=AD(YSRC,Zinteg)-0.50AD(RESET,Zinteg)-
    0.50AD(NOSRC,Zinteg)
ZsrcXsen=AD(ZSRC,Xinteg)-0.25AD(RESET,Xinteg)-
    0.75AD(NOSRC,Xinteg)
ZsrcYsen=AD(ZSRC,Yinteg)-0.25AD(RESET,Yinteg)-
    0.75AD(NOSRC,Yinteg)
ZsrcZsen=AD(ZSRC,Zinteg)-0.25AD(RESET,Zinteg)-
    0.75AD(NOSRC,Zinteg)

and where, for X, Y and Z sources and X, Y and Z sensor integrators,

AD(iSRC, jinteg) is the sampled integrator value for the jth sensor integrator; while the ith source is transmitting, AD(RESET, jinteg) is the sampled integrator value for the jth sensor integrator during an integrator reset interval, and AD(NOSRC, jinteg) is the sampled integrator value for the jth sensor integrator during an interval when no transmission source is transmitting.

19. The apparatus in claim 14 wherein said processor includes a programmed computer and wherein said programmed computer defines said integrator.

20. The apparatus in claim 12 wherein each of said field sensing elements is a dipole antenna.

21. An apparatus for determining the position and orientation of a remote object relative to a reference coordinate frame comprising:
   a source having a plurality of field generating elements, wherein said field generating elements generate electromagnetic fields and have spatially independent components defining a source reference coordinate frame;
   a driver, wherein said driver applies sequentially to said plurality of field generating elements pulsed-DC signals which are time-division multiplexed in order to generate a plurality of electromagnetic fields that have steady state components and are distinguishable from one another;
   a remote sensor having a plurality of passive field sensing elements that are responsive to the rate-of-change of said generated electromagnetic fields in order to sense each of said generated electromagnetic fields, said sensing elements having spatially independent components; and
   an integrator, wherein said integrator integrates the output of said remote sensor in order to establish the steady state components of said generated electromagnetic fields.

22. The apparatus in claim 21 including a processor, wherein said processor resolves said steady state components into remote object position and orientation.

23. The apparatus in claim 21 wherein said processor includes a programmed computer and wherein said programmed computer defines said integrator.

24. A method of determining the position and orientation of a remote object relative to a reference coordinate frame comprising:
   generating a plurality of electromagnetic fields in a source reference coordinate frame, said fields having spatially independent components and being distinguishable from one another, wherein said generating includes applying pulsed-DC signals sequentially to a plurality of field generator elements having spatially independent components, defining a field generation cycle, whereby said electromagnetic fields have steady state components and are time-division multiplexed;
   sensing said generated electromagnetic fields with a remote sensor having a plurality of field sensing elements, said sensing elements having spatially independent components in order to detect each of said generated electromagnetic fields; and
   processing the output of said remote sensor into remote object position and orientation relative to said source reference coordinate frame by integrating the output of said field sensor over a given period of time in order to establish the steady state components of said generated electromagnetic fields and resolving said steady state components into remote object position and orientation.

25. The method of claim 24 wherein said processing includes integrating the output of said field sensor over a given period of time that is one said transmission cycle.

26. The method of claim 25 wherein said processing includes sampling said integral approximately at the end of each of said pulsed-DC signals.

27. The method of claim 25 wherein said processing includes sampling said integral a plurality of times during each of said pulsed-DC signals.

28. The method of claim 24 wherein said processing includes sampling said integral approximately at the end of each of said pulsed-DC signals.

29. The method of claim 24 wherein said processing includes sampling said integral a plurality of times during each of said pulsed-DC signals.

30. The method of claim 24 wherein said sensing includes use of passive sensing elements that respond to the rate-of-change of said electromagnetic fields.

31. The method of claim 24 wherein said processing includes resetting said integral after said given period of time.

32. The method of claim 31 including sampling said integral before and after said resetting.

33. The apparatus in claim 24 wherein said processing includes integrating the outputs of all of said field sensing elements over said given period of time in order to produce multiple integrals, sampling said multiple integrals and calculating said remote object position and orientation from the sampled integrals.

34. A method of determining the position and orientation of a remote object relative to a reference coordinate frame comprising:
   generating a plurality of electromagnetic fields by applying time-division multiplexed pulsed-DC signals to a plurality of field generating elements, defining a field generation cycle, said field generating elements having spatially independent components defining a source reference coordinate frame, whereby said fields have steady state components and are distinguishable from one another;
   sensing said generated electromagnetic fields with a remote sensor having a plurality of passive field sensing elements having spatially independent components in order to detect the rate-of-change of each of said generated electromagnetic fields; and resolving the output of said remote sensor into remote object position and orientation relative to said source reference coordinate frame.

35. The method of claim 34 wherein said resolving includes integrating the output of said passive field sensor over a given period of time in order to produce an integral for each said independent component, and calculating remote object position and orientation from the integrals.

36. The method of claim 35 wherein said resolving includes integrating over a given period of time that is one said field generation cycle.

37. The method of claim 35 wherein said resolving includes sampling each said integral approximately at the end of each of said pulsed-DC signals.

38. The method of claim 35 wherein said resolving includes sampling each said integral a plurality of times during each of said pulsed-DC signals.

39. The method of claim 35 wherein said resolving includes resetting said integral after said given period of time.

40. The method of claim 39 including sampling said integral before and after said resetting.

41. The method of claim 40 wherein said resolving includes calculating remote position and orientation from a matrix S where $$S = \begin{vmatrix} XscrXsen & YscrXsen & ZsrcXsen \\ XscrYsen & YsrcYsen & ZsrcYsen \\ XscrZsen & YscrZsen & ZsrcZsen \end{vmatrix}$$

where

XsrcXsen=AD(XSRC,Xinteg)-0.75AD(RESET,Xinteg)-0.25AD(NOSRC,Xinteg)

XsrcYsen=AD(XSRC,Yinteg)-0.75AD(RESET,Yinteg)-0.25AD(NOSRC,Yinteg)

XsrcZsen=AD(XSRC,Zinteg)-0.75AD(RESET,Zinteg)-0.25AD(NOSRC,Zinteg)

YsrcXsen=AD(YSRC,Xinteg)-0.50AD(RESET,Xinteg)-0.50AD(NOSRC,Xinteg)

YsrcYsen=AD(YSRC,Yinteg)-0.50AD(RESET,Yinteg)-0.50AD(NOSRC,Yinteg)

YsrcZsen=AD(YSRC,Zinteg)-0.50AD(RESET,Zinteg)-0.50AD(NOSRC,Zinteg)

ZsrcXsen=AD(ZSRC,Xinteg)-0.25AD(RESET,Xinteg)-0.75AD(NOSRC,Xinteg)

ZsrcYsen=AD(ZSRC,Yinteg)-0.25AD(RESET,Yinteg)-0.75AD(NOSRC,Yinteg)

ZsrcZsen=AD(ZSRC,Zinteg)-0.25AD(RESET,Zinteg)-0.75AD(NOSRC,Zinteg)

and where, for X, Y and Z sources and X, Y and Z sensor integrators,

AD(iSRC, jinteg) is the sampled integrator value for the jth sensor integrator; while the ith source is transmitting, AD(RESET, jinteg) is the sampled integrator value for the jth sensor integrator during an integrator reset interval, and AD(NOSRC, jinteg) is the sampled integrator value for the jth sensor integrator during an interval when no transmission source is transmitting.

42. A method of determining the position and orientation of a remote object relative to a reference coordinate frame comprising:

generating a plurality of electromagnetic fields having steady state components by applying time-division multiplexed pulsed-DC signals to a plurality of field generating elements having spatially independent components defining a source reference coordinate frame, whereby said fields are distinguishable from one another;

sensing said generated electromagnetic fields with a remote sensor having a plurality of passive field sensing elements having spatially independent elements in order to detect the rate-of-change of each of said generated electromagnetic fields; and integrating the output of said remote sensor in order to establish the steady state components of said generated electromagnetic fields.

43. The method of claim 42 including resolving said established steady state components into remote object position and orientation.

* * * * *

UNITED STATES PATENT AND TRADEMARK OFFICE
CERTIFICATE OF CORRECTION

PATENT NO. : 5,453,686
DATED : September 26, 1995
INVENTOR(S) : Peter T. Anderson It is certified that error appears in the above-indentified patent and that said Letters Patent is hereby corrected as shown below:

Column 4, line 10;

"32ain" should be --32a in--.

Column 4, line 14;

"32bin" should be --32b in--.

Column 8, lines 5 to 8;

$$"S = \begin{vmatrix} XscrXsen & YscrXsen & ZsrcXsen \\ XscrYsen & YsrcYsen & ZsrcYsen \\ XscrZsen & YsrcZsen & ZsrcZsen \end{vmatrix}"$$

Should be $$--S = \begin{vmatrix} XsrcXsen & YsrcXsen & ZsrcXsen \\ XsrcYsen & YsrcYsen & ZsrcYsen \\ XsrcZsen & YsrcZsen & ZsrcZsen \end{vmatrix}--$$

Column 10, claim 12, line 25;

"multiplexer" should be --multiplexed--.

UNITED STATES PATENT AND TRADEMARK OFFICE
CERTIFICATE OF CORRECTION

PATENT NO. : 5,453,686
DATED : September 26, 1995
INVENTOR(S) : Peter T. Anderson It is certified that error appears in the above-indentified patent and that said Letters Patent is hereby corrected as shown below:

Column 10, claim 18, line 62;

$$\text{"}S = \begin{vmatrix} XscrXsen & YscrXsen & ZsrcXsen \\ XscrYsen & YsrcYsen & ZsrcYsen \\ XscrZsen & YscrZsen & ZsrcZsen \end{vmatrix}\text{"}$$

Should be $$\text{--}S = \begin{vmatrix} XsrcXsen & YsrcXsen & ZsrcXsen \\ XsrcYsen & YsrcYsen & ZsrcYsen \\ XsrcZsen & YsrcZsen & ZsrcZsen \end{vmatrix}\text{--}$$

Column 13, claim 41, line 32:

UNITED STATES PATENT AND TRADEMARK OFFICE
CERTIFICATE OF CORRECTION

PATENT NO. : 5,453,686
DATED : September 26, 1995
INVENTOR(S) : Peter T. Anderson It is certified that error appears in the above-indentified patent and that said Letters Patent is hereby corrected as shown below:

$$"S = \begin{vmatrix} XscrXsen & YscrXsen & ZsrcXsen \\ XscrYsen & YsrcYsen & ZsrcYsen \\ XscrZsen & YscrZsen & ZsrcZsen \end{vmatrix} \quad "$$

Should be $$--S = \begin{vmatrix} XsrcXsen & YsrcXsen & ZsrcXsen \\ XsrcYsen & YsrcYsen & ZsrcYsen \\ XsrcZsen & YsrcZsen & ZsrcZsen \end{vmatrix} \quad --$$

Signed and Sealed this

Seventh Day of May, 1996

Attest:

BRUCE LEHMAN

*Attesting Officer*    *Commissioner of Patents and Trademarks*